US005536046A

United States Patent [19]

Chang

[11] Patent Number: 5,536,046

[45] Date of Patent: *Jul. 16, 1996

[54] HEAT SENSITIVE SYSTEM AND USE THEREOF

[75] Inventor: John C. H. Chang, Naperville, Ill.

[73] Assignee: Wallace Computer Services, Inc., Hillside, Ill.

[ * ] Notice: The term of this patent shall not extend beyond the expiration date of Pat. No. 5,536,046.

[21] Appl. No.: 390,032

[22] Filed: Feb. 17, 1995

Related U.S. Application Data

[63] Continuation of Ser. No. 987,710, Dec. 9, 1992, Pat. No. 5,427,415.

[51] Int. Cl.[6] .......................... B42D 15/10; B41M 5/28; B32B 3/16

[52] U.S. Cl. ............................... 283/67; 283/57; 283/94; 283/95; 283/114

[58] Field of Search ................................ 283/67, 87, 91, 283/92, 93, 94, 95, 57, 58, 902, 904; 359/43, 288

[56] References Cited

U.S. PATENT DOCUMENTS

| | | | |
|---|---|---|---|
| 2,929,736 | 3/1960 | Miller et al. . | |
| 3,713,861 | 1/1973 | Sharp . | |
| 3,829,133 | 8/1974 | Smagala-Romanoff . | |
| 4,037,007 | 7/1977 | Wood . | |
| 4,109,047 | 8/1978 | Fredrickson . | |
| 4,175,774 | 11/1979 | Tonges et al. . | |
| 4,183,989 | 1/1980 | Tooth . | |
| 4,186,020 | 1/1980 | Wachtel . | |
| 4,197,346 | 4/1980 | Stevens . | |
| 4,210,346 | 7/1980 | Mowry, Jr. et al. . | |
| 4,303,307 | 12/1981 | Tureck et al. . | |
| 4,360,548 | 11/1982 | Skees et al. . | |
| 4,376,887 | 3/1983 | Greenaway et al. . | |
| 4,488,646 | 12/1984 | McCorkle . | |
| 4,505,498 | 3/1985 | Weinberger . | |
| 4,726,608 | 2/1988 | Walton . | |
| 4,846,502 | 7/1989 | Chang et al. . | |
| 4,873,219 | 10/1989 | Brown et al. . | |
| 5,193,854 | 3/1993 | Borowski, Jr. et al. . | |
| 5,260,252 | 11/1993 | Frangie et al. . | |
| 5,338,066 | 8/1994 | Gundjian | 283/67 |
| 5,354,723 | 10/1994 | Gundjian | 503/201 |
| 5,401,060 | 3/1995 | Chang et al. | 283/57 X |

FOREIGN PATENT DOCUMENTS

| | | |
|---|---|---|
| 2722427 | 5/1977 | Germany . |
| 2913321 | 4/1979 | Germany . |
| 61-248784 | 11/1986 | Japan . |
| 2227794 | 10/1987 | Japan . |
| 2122995 | 5/1990 | Japan . |
| 1520919 | 12/1975 | United Kingdom . |
| 2188283 | 4/1987 | United Kingdom . |
| 9100390 | 1/1991 | WIPO . |

OTHER PUBLICATIONS

Research Disclosure (No. 187), Nov. 1979, pp. 638–639.

*Primary Examiner*—Frances Han

*Attorney, Agent, or Firm*—Roylance, Abrams, Berdo & Goodman

[57] ABSTRACT

A heat sensitive system comprises a document having a localized, non-pressure sensitive, coating of chromogenic composition activated at moderate temperatures. Quickly striking the chromogenic composition with a fingernail or blunt object produces a colored image by frictional heat. The chromogenic composition contains a chromogenic compound and a color developer which are non-pressure sensitive and nonreactive at room temperature. The chromogenic composition can be an intimate mixture of the chromogenic compound and the developer or alternatively separate layers of each of the components.

33 Claims, 3 Drawing Sheets

HEAT SENSITIVE SYSTEM AND USE THEREOF

This is a continuation of application Ser. No. 07/987,710, filed Dec. 9, 1992 now U.S. Pat. No. 5,427,415.

CROSS-REFERENCE TO RELATED APPLICATION

Reference is hereby made to U.S. application Ser. No. 07/987,694, now U.S. Pat. No. 5,344,191, issued Sep. 6, 1994 entitled "Hidden Entry System and Use Thereof" to John C. H. Chang and Peter A. Walter, the disclosure of which is hereby incorporated by reference.

FIELD OF THE INVENTION

The present invention is directed to a heat sensitive chromogenic system which is heat activatable at relatively low temperatures. More particularly, this invention relates to documents having a localized, non-pressure sensitive chromogenic coating that can be activated by heat to produce a visible colored mark for determining authenticity.

BACKGROUND OF THE INVENTION

Various methods of providing documents, such as negotiable instruments, with tamper evident systems to prevent alteration have been proposed. Likewise, systems have also been developed to prevent reproduction of documents by photocopying to reduce the incidence of fraud. However, in recent years advanced color copiers which are readily accessible to the general public can produce nearly exact duplicates of the original document. It is very difficult for the untrained person to distinguish the original from an illicit reproduction. To prevent passing off of the reproduction as the original, efforts have been made to make the original document incapable of being copied or to incorporate authenticating systems into the document.

One known method of producing a paper that is useful for preventing fraud in security documents is to print the paper with a chemical in the form of an invisible image. When a bleach solution or an ink eradicator is applied over the area of the invisible image, a colored image appears to confirm its authenticity. However, this method is often undesirable because the bleach solution is corrosive, the ink eradicator contains toxic solvents, and the solution tends to warp or otherwise permanently damage the document.

Another method is to print a document with a fluorescent ink which is colorless under visible light, but becomes discernible when exposed to ultra-violet light. Similarly, a fluorescent ink may be printed on a document for automatic identification by an electronic scanner such as that disclosed in U.S. Pat. No. 4,186,020 to Wachtel. The use of fluorescent ink requires access to a source of ultraviolet light or a document verifying electronic scanner. This prevents quick and easy verification of the document.

A further prior method is disclosed in U.S. Pat. No. 4,183,989 to Tooth in which security paper is provided with a strip, thread or planchette having at least two machine verifiable security features, one of which is a magnetic material and a second of which is a luminescent material, an X-ray absorbent or a metal. Since most security documents are printed paper products with different base weight, color and texture requirements, the availability of various papers having these security features is very limited. This system also has the disadvantage of requiring specialized and expensive verifying machines to examine the documents and determine its authenticity.

U.S. Pat. No. 4,726,608 to Walton discloses the use of an opaque coating over an authenticating indicia. The image of the indicia is later made visible by scratching off the opaque coating or by applying a solvent to disperse the coating. This system further has the disadvantage of either requiring solvents or producing unwanted dust.

Still another method identifying forgeries is by micro-printing where a massage, logo, or name is printed in very small type as a border around the face of the document. Generally, the message cannot be read by the naked eye, and requires some magnification to make it legible. Copiers cannot duplicate the micro-printing with sufficiently high resolution, so that on a copy the words become just a broken line or blur. However, the tellers at a bank or persons accepting the document generally do not have access to magnifiers and thus, a copy will not be easily noticeable.

"Sunburst" or "Rainbow" printing is sometimes used to help defeat color copiers in which the document is printed with one intense color at one side of the document which slowly fades into another color across the width of the paper. Eventually the second color intensifies at the opposite side. This is a visual system that is difficult to duplicate on a copier. If the original printing is not available for comparison, it is extremely difficult for the untrained eye to know it is a copy or authentic.

Another method is disclosed in U.S. Pat. No. 4,210,346 to Mowry Jr. et al. in which "VOID" or other warning messages is pre-printed in halftone or multitone on the document to camouflage the pre-printing. These pre-printed messages are blended into the surroundings of the document so that human eyes see them as a uniform printing. The pre-printed "VOID" or warning messages will appear on the illegal copy by many color copiers. However, more sophisticated color copiers have been developed in recent years so that a skillful lawbreaker can now reproduce a security document without the pre-printed warning messages appearing on the copies.

Another method of reducing the risk of fraud is to incorporate a color forming substance into the substrate of the document. To verify the authenticity of a document, a second color forming substance which is capable of taking part in a color-forming reaction is applied to the security document to reveal the hidden images or produce color changes. Examples of this form of detection system are disclosed in U.S. Pat. Nos. 4,037,007 to Wood and 4,360,548 to Skees et al. However, the second color forming substance is not generally available at every location where the security documents are handled or whenever it is needed. Thus, these documents can not be readily tested for their authenticity.

The above noted security and authentication systems have not entirely prevented unauthorized or fraudulent reproduction of documents. Accordingly, a need still exists for a simple and efficient system which is able to accurately authenticate a document and distinguish it from a reproduction.

SUMMARY OF THE INVENTION

A heat sensitive system has now been discovered which can be used to identify an illicit reproduction of a document, such as a negotiable instrument, a pharmaceutic prescription, redeemable coupon, or the like, which system comprises paper bearing a localized, non-pressure sensitive coating of a heat activatable chromogenic composition for producing a visible colored image by application of heat. The verification system of the present invention comprises a document comprising a support having an information area bearing a visible principal image and a verification area comprising a localized coating of a heat activatable chromogenic composition for producing a visible colored image by application of heat. Surprisingly, it has been found that by using a localized coating of a non-pressure sensitive, heat activatable composition for revealing illicit reproductions of the authentic document, premature verification by ordinary writing and handling pressures is avoided. Thus, while the heat activatable coating of the present invention may be subjected to ordinary writing pressures without producing the desired visible colored image before verification is required, application of frictional heat to the coating will result in a visible colored image.

According to one embodiment of the present invention, a method of verifying the authenticity of a document is provided, which comprises applying frictional heat to the verification area, such as by rubbing or striking a human fingernail across the chromogenic composition, to form a visible colored image, whereby the chromogenic composition is activated by frictional heat but not pressure. The expression "strike" as used in the present application is in the sense that one strikes a match across a rough surface to generate frictional heat. In the present invention, striking or quickly moving the human fingernail or other frictional heat generating stylus across the chromogenic composition generates sufficient frictional heat to cause visible color formation.

According to another embodiment of the present invention, heat is applied to the verification area of a document by means of a radiant or convective heat source, such as the heat emanating from an ordinary light bulb used for reading, for example, a 100 watt light bulb, or from an electric hair dryer, to cause visible color formation in the chromogenic composition. Likewise, heat can be directly applied by conduction using an electrically or otherwise heated element such as a flat metal plate having, for example, a rectangular shape the shape and size of the verification area.

In a preferred embodiment of the present invention, the heat activatable chromogenic composition comprises a color forming chromogenic compound and a color developer material. In an especially preferred embodiment of the invention, a heat fusible material is also included in the chromogenic composition to lower the melting point of the color developer material. Preferably, the color developer material is a normally solid, acidic organic compound having a melting temperature between 40° C. and 200° C. so that the developer will melt or soften sufficiently by frictional heat or heat supplied by a relatively low heat generating device, such as an electric light bulb or hair dryer, to react with the chromogenic compound to produce a visible colored image. The original document can be distinguished from a reproduction by applying heat, for example, by quickly rubbing or striking a fingernail, paper clip, coin, pen or other implement across the verification area to produce sufficient frictional heat, or by applying convective, radiant or conductive heat to the verification area to produce the visible colored image.

The visible colored image in the verification area can be by color contrast between the color of the principal image and the developed color of the chromogenic composition. Also, the visible colored image may be a solid coating in a regular or irregular form of the chromogenic composition such that verification is provided by striking the coating to produce a single line or repeatedly striking the coating to produce a group of lines or striking or otherwise heating the entire coating or any portion of the coating as desired.

According to a preferred embodiment of the present invention, the chromogenic composition comprises a first layer comprising a latent image of a message, such as "ORIGINAL" formed of the color developer material, and a second adjacent layer including the chromogenic compound. Alternatively, the latent image can be printed using the chromogenic compound followed by a coating of the color developer material to form the heat activatable coating. By applying heat, e.g., frictional heat, to the chromogenic composition, the chromogenic compound and the color developer react to produce a visible, colored image in the form of the message. Of course, if a latent image message is not desired, a solid coating of both the chromogenic composition and the color developer material may be applied in two layers.

According to a further embodiment of the invention, the verification system comprises a support having an information area bearing a visible principal image and a localized verification area comprising a heat activatable chromogenic composition for producing a visible colored image by heating at least a portion of the verification area to a temperature of between about 60° C. and about 200° C. where the chromogenic composition is a mixture of solid particles of the chromogenic compound and the color developer material to form an autogenous coating. Of course, the mixture may be coated to provide a latent image message or as a solid coating. Preferably, a fingernail or blunt instrument having a low heat conductivity is rubbed or struck quickly across the verification area to produce sufficient heat to provide a colored image.

According to a further embodiment of the present invention, the verification area is coextensive with the information area or principal image on the document. The verification area may be on the same side of the document as the principal image, or alternatively, on the opposite side of the document from the principal image. In an alternative embodiment, the verification area is on the opposite side of the principal image of the document and coextensive with the information area such that it is exposed to pressure when pressure is applied to the information area to supply additional information, such as filling out the amount of a check or money order or by signing the document. The pressures applied to the verification area by writing with a pen or typewriter generally do not produce sufficient frictional heat to activate the chromogenic composition and thus do not produce the colored image in the information area.

According to another embodiment of the present invention, the verification system is applied to a negotiable instrument where the principal image is a monetary amount, such as in the case of a check. In this embodiment, the verification area is contained in the endorsement area on the reverse side of the negotiable instrument. Thus, when the negotiable instrument is submitted for payment, the authenticity of the negotiable instrument can be verified by applying heat, e.g., frictional heat, to the verification area in the endorsement area of the negotiable instrument.

According to another embodiment of the present invention, the verification area may be treated to conceal the latent image message. Despite use of a colorless or chromogenic verification system, light reflection can reveal the latent image message of the verification system. According to this embodiment of the invention, the latent image message is coated with a thin coating comprising pigment in a binder which conceals the latent image message without substantially reducing frictional heat activated color development nor frictional heat activation characteristics of the chromogenic composition. Alternatively, concealment of the latent image message of the chromogenic coating or the chromogenic coating itself may be accomplished by dot printing the verification area using conventional printing inks in any color other than that of the latent image. Since the chromogenic coating is colorless, application of the thin pigmented coating or dot printing may be accomplished prior to application of the chromogenic coating, if desired.

As used in the present application, the term "principal image" is defined as a visible image which is applied or present on the document in the information area in printed or written form.

In the embodiment of the present invention where the document is a negotiable instrument, such as a check, money order, etc., the principal image can be a monetary amount in numerical or written form, name of the financial institution, name of the payor or the payee. Likewise, the principal image can be all or a portion of the written material of the document which is subject to unauthorized reproduction and fraudulent passing off as the original document. Likewise, in the embodiment of the present invention where the document is a medical prescription, the principal image can be both preprinted matter and hand-written information.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure.

DETAILED DESCRIPTION OF THE INVENTION

Figure 1:
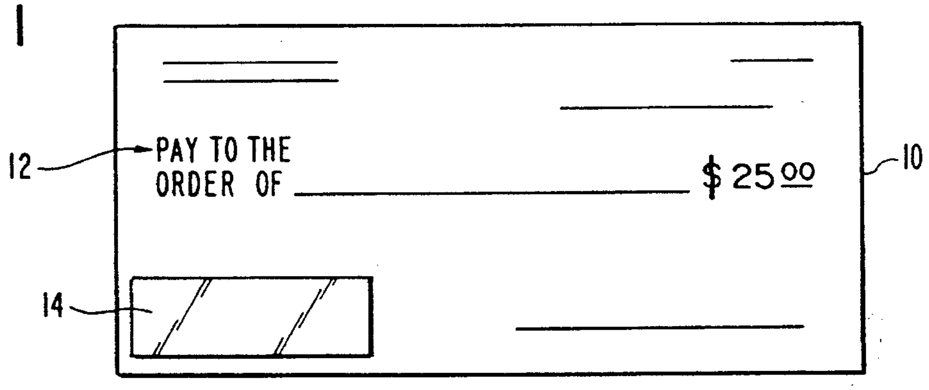
FIG. 1 is a front view of a negotiable instrument showing the verification area on the front face of the instrument.
Figure 2:
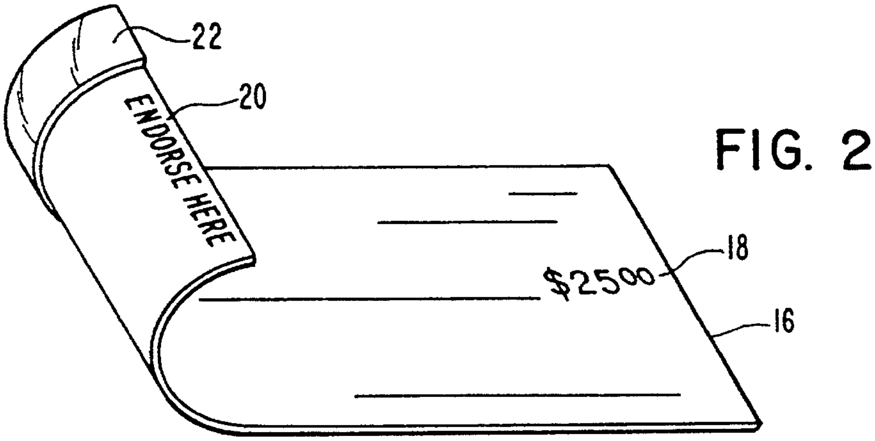
FIG. 2 is a schematic and perspective view of the negotiable instrument in the form of a check showing the endorsement area on the reverse side of the instrument with the verification area contained therein.

Referring to the drawings, FIGS. 1 and 2 illustrate a verification system in combination with a document 10, which in this embodiment is a bank check. The document 10 includes an information area 12 bearing a principal image and a verification area 14.

The term "document" as used herein is intended to include any type of document or paper which can be reproduced by a photocopier or other reproduction equipment. The documents of particular interest are those documents which have a high incidence of reproduction for fraudulent purposes. In preferred embodiments of the invention, the document is a negotiable instrument such as a money order or check including personal checks, cashier's checks and traveler's checks. In further embodiments, the document may include, for example, pharmaceutical prescriptions, contracts, letters, deeds, wills, bills of exchange, certificates of deposit, warrants, stocks, bonds, identification cards, lottery tickets, sweepstakes, raffles, prizes and awards. As used herein, the expression "negotiable instrument" refers to any instrument which can be exchanged for or represents a monetary amount or its equivalent value.

The information area 12 on the check of the embodiment of FIG. 1 is filled in with specific information at the time the check is issued in a manner similar to conventional check writing procedures. The information area will include such information as the date, the amount of the check, the name of the bank, the payee, the signature of the payor and the endorsement of the payee. The printed information contained in the information area comprises a principal image of the document.

The verification area 14 in the embodiment of FIG. 1 is positioned in the lower left hand corner of the front face of the check in the area typically identified as "memo" for entering a personal reference by the person drawing the check. It is to be understood that the verification area may be located in any position or area on the check and that multiple verification areas may be present, such as on both the front and rear faces of the document. A localized coating of a heat activatable, non-pressure sensitive chromogenic composition is applied to the verification area. Multiple localized heat activatable coatings may be provided on the document at spaced positions to provide multiple verification areas or within a single verification area to provide multiple colors within a single verification area.

The chromogenic compound in preferred embodiments is colorless or substantially colorless before reacting with the color developer to produce the colored image. Suitable types of chromogenic compounds include diarylmethanes, triarylmethanes, indolylphthalides, azaphthalides, fluorans, and spiropyrans. Exemplary diarylmethanes include 4,4'-bis-(dimethylaminobenzhydrylbenzyl)ether, N-halophenyl leuco auramine, and N-2,4,5-trichlorophenyl leuco auramine. Examples of triarylmethanes include 3,3-bis(p-dimethylaminophenyl)-6-dimethylaminophthalide and 3,3-bis(p-dimethylaminophenyl)phthalide. Examples of indolylphthalides include 3-(p-dimethylaminophenyl)-3-(1,2-dimethylindole-3-yl)phthalide and 3-(p-dimethylaminophenyl)-3-(2-methylindole- 3-yl)phthalide. Examples of azaphthalides include 3-(2-ethoxy-4-diethylaminophenyl)-3-(1-octyl-2 -methylindole-3-yl)-4-azaphthalide and 3-(2-ethoxy-4 -diethylaminophenyl)-3-(1-ethyl-2-methylindole-3-yl)-4-azaphthalide. Examples of fluorans include 2-dibenzylamino- 6-diethylaminofluoran, 2-anilino-6-diethylaminofluoran, 3-methyl-2-anilino-6-diethylaminofluoran, 2-anilino-3-methyl-6-(ethyl-isopentylamino)fluoran, 2-anilino-3-methyl-6-dibutylaminofluoran, 2-chloro-3-methyl-6-diethylaminofluoran, 3,6-dimethoxyfluoran, and 7,7'-bis(3-diethylaminofluoran). Examples of spiropyrans include 3-methylspirodinaphthopyran, 3-ethylspirodinaphthopyran, 3,3'-dichlorospirodinaphthopyran, 3-benzyl-spirodinaphthopyran, and 3-methylnaphtho-(3-methoxybenzo)spiropyran.

The preferred color developers are acidic compounds which have melting or softening points of about 40° C. to about 200° C. In preferred embodiments of the invention, the lower melting point developers having melting or softening points preferably from about 40° C. or 50° C. to about 110° C. or about 140° C., with from about 50° C. to about 80° C. being especially preferred so that the colored image is easily formed by applying frictional heat or similar low temperatures. The developer melting point should, however, be sufficiently high to avoid melting and thus premature activation and formation of the colored image during drying of the coating, shipping and handling of the document. Examples of useful color developers include: 4,4'-isopropylidenedi-phenol, 4,4'-isopropylidene-bis( 2-tert-butylphenol), 4,4'-sec-butylidenediphenol, 2,2'-methylene-bis(4-chlorophenol), phenol-formaldehyde novolak resin, alpha-naphthol, betanaphthol, p-hydroxybenzyl benzoate, 3,5-dimethyl-4-hydroxybenzoic acid, 3-isopropylsalicylic acid, 3-benzylsalicylic acid, 3,5-di-tert-butylsalicylic acid, 1,5-di(4-hydroxyphenylthio)-3-oxapentane, 4-hydroxyphenyl-4'-isopropoxyphenylsulfone, bis(3-allyl-4-hydroxyphenyl-)sulfone, 4,4'thiodiphenol, and 3,3'-dimethyl- 4,4'thiodiphenol.

The proportions of chromogenic compound and color developer in the coating varies according to the required color density of the image. Generally, about 1 to 50 parts by weight, and preferably about 1 to 10 parts by weight, of color developer is used per part by weight of chromogenic compound to produce a colored image with sufficiently sharp contrast to readily distinguish the colored image from the principal image. If desired, however, the colored image may be the same as the principal image.

When the color developers have a high melting point, a heat-fusible material may be used in the chromogenic composition to lower the activation point or temperature of the color developer to facilitate the color development. Exemplary heat-fusible materials include stearic acid amide, stearic acid methylene bisamide, oleic acid amide, palmitic acid amide, coconut fatty acid amide, monoethanolamide of fatty acid, dibenzyl terephthalate, p-benzyl biphenyl, beta-naphthol benzyl ether, ethylene glycol-m-tolyl ether, di(p-chlorobenzyl) oxalate, and di(p-methylbenzyl) oxalate.

The chromogenic coating composition may also contain one or more inorganic or organic fillers, such as kaolin, talc, titanium dioxide, calcium carbonate, magnesium carbonate, barium carbonate, aluminum hydroxide, zinc oxide, silicone oxide, urea-formaldehyde resin, styrene-methacrylic acid copolymer, polystyrene resin, polycarbonate resin, polypropylene resin. The amount of filler used may vary depending on the chromogenic compound, developer and support material. The filler material is included as an extender material to reduce the amount of chromogenic compound and developer used and may be used to enhance the film-forming qualities of the chromogenic coating. The amount of filler material incorporated into the chromogenic coating composition should not substantially interfere with the development of the colored image.

A suitable binder material is needed to adhere the chromogenic compound and the color developer onto the substrate. The amount of binder generally used is about 10% to about 50% by weight, and preferably about 15% to about 35% by weight, based on the total weight of the solids of the coating composition. Examples of useful binders include starch, hydroxyethyl cellulose, methyl cellulose, carboxymethyl cellulose, gelatin, casein, gum arabic, polyvinyl alcohol, styrene-maleic anhydride copolymers, ethylene-acrylic acid copolymers, styrene-butadiene copolymers, acrylonitrile-butadiene copolymers, vinyl acetate emulsions, ethylene-vinyl acetate emulsions.

The heat activatable chromogenic composition of the present invention may optionally additionally contain a color suppressant to prevent premature coloration. The color suppressant must be so chosen that it will not inhibit or adversely affect the color formation in the final product. Examples are ammonium hydroxide, alkanolamines, such as monoethanol amine, diethanolamine, N, N-dimethylethanolamine, and the like, condensates of amine-formaldehyde, such as urea-formaldehyde, melamine-formaldehyde, and the like. Suitable amounts of such color suppressants include from about 0.1 to about 10, preferably from about 0.5 to about 4 percent by weight based on the total dry weight of the coating composition. Other suitable color suppressants are disclosed, for example, in U.S. Pat. Nos. 4,010,292 and 4,170,483, which are hereby incorporated by reference.

The chromogenic coating composition may be prepared by a number of methods as known in the art. A preferred method of preparing the coating composition is to disperse one or more of the reactants into a volume of water as a dispersing medium. The reactants are generally ground for about one hour to a particle size of about 1 to 10 microns in diameter. The reactants may be ground in the presence of dispersants or binders. Examples of suitable dispersants include sodium dioctylsulfosuccinate, sodium dodecylbenzene sulfonate, alginates and fatty acid metal salts. The binder material may also function as a protective colloid to disperse the reactants. The chromogenic compound and the color developer may be mixed together and applied as one coating or prepared as separate coating compositions and applied in layers as discussed hereinafter in greater detail. The reactants are then ground or pulverized in a suitable device such as, for example, a ball mill, sand mill or attritor.

The verification area comprising the localized coating of a chromogenic composition may be treated so as to conceal location of the latent image message, since light reflection can reveal location of the message of the verification system. Thus, the latent image message can be coated with a thin coating comprising pigment in binder which conceals the latent image message without substantially reducing heat activated color development or heat activation characteristics of the chromogenic coating. A suitable coating may comprise, for example, inorganic fillers, such as calcium carbonate, titanium dioxide, talc, clay, or the like, in a polyvinyl alcohol solution. The thin coating provides the same texture to the support as the coating forming the latent image message and, thus, effectively conceals the message. Alternatively, concealment of the latent image message of the chromogenic coating may be accomplished by dot printing the latent image message or the entire surface of the document including the verification area using conventional printing inks in any color other than that of the latent image. Since the chromogenic coating is colorless, the pigmented coating or dot printing may be applied either prior to or after application of the chromogenic coating to the substrate.

The chromogenic coating composition is applied to the substrate, for example, paper, plastic, or the like, which forms the document by any suitable technique as known in the art. The entire substrate may be coated although in preferred embodiments a localized, spot or band coating is used. The coating may be coextensive with the information area and the principal image since the coating is non-pressure sensitive and not affected by the pressure applied when the document is printed or written on such as by a pen to supply additional information. In one embodiment of the invention, the chromogenic coating composition is prepared as a slurry comprising the chromogenic compound and the color developer. A preferred method of coating is by off-set gravure coating as disclosed in U.S. Pat. No. 4,425,386 to Chang which is hereby incorporated by reference. Alternative preferred coating methods include flexographic, screen printing, nozzle extrusion and ink jet printing.

Preferably, the chromogenic coating material is activated by quickly rubbing a blunt implement across the verification area to generate sufficient frictional heat to produce a colored image. For convenience, a suitable implement may be a fingernail rubbed quickly across the verification area to generate frictional heat and produce a colored line. Other implements which may be used include a non-writing end of a pen, a stylus, paper clip, coin and the like. Generally, metal objects are not as effective in producing a colored image since the metal conducts the frictional heat quickly away from the point of contact and has a lower friction coefficient than many other objects. Thus, a fingernail or plastic object is generally preferred.

However, any suitable means for applying sufficient heat, whether frictional or otherwise, can be used to heat the chromogenic composition and produce a visible colored image. The heat providing means should be capable of heating the chromogenic composition to a temperature of between about 40° C. to 200° C., preferably between about 40° C. or 50° C. to about 110° C. or 140° C., with between about 50° C. and about 80° C. being especially preferred for certain applications. Thus, suitable heat sources include ordinary electric light bulbs, for example, 80–150 watt bulbs, hand-held electric hair dryers, coffee mugs containing a hot liquid, or like devices which generate such temperatures. Similarly, a heated metal element, such as a flat plate-like element for direct application of heat to the chromogenic composition, may be used.

Figure 3:
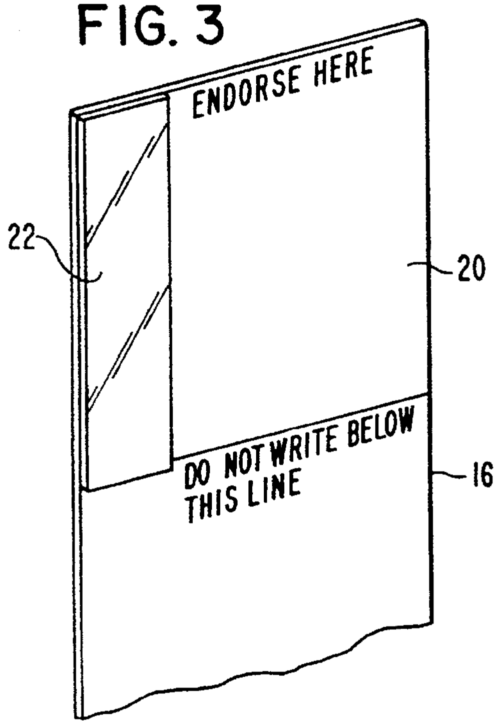
FIG. 3 is a schematic and perspective view of the check of FIG. 2 in accordance with a preferred embodiment of the invention.

In a further embodiment illustrated in FIGS. 2 and 3, a document in the form of a check 16 comprises an information area 18 having a principal image. The principal image in the information area 18 contains a conventional printed image as in the embodiment of FIG. 1. Also included on the check of this embodiment is a designated endorsement area 20 on the back face of the check opposite the principal image. The endorsement area 20 defines the area at one end of the check for the payee's endorsement. As shown in FIG. 3, the endorsement area includes a pre-printed principal image providing instructions for the person endorsing the check according to standard banking procedures. In the left portion of the endorsement area as shown in FIG. 3 is a verification area 22 comprises a coating of a mixture of the chromogenic compound and the color developer to form an autogenous chromogenic coating. In this manner, the verification area is in a handy position next to the endorsement area of the check. Thus, if the check is submitted for payment, the person receiving the check can verify the authenticity of the check by quickly rubbing their fingernail or other hard object across the verification area adjacent the signature to produce the colored image. Since the chromogenic coating is not pressure sensitive, endorsement, alone, will not activate the coating and produce a visible color.

Verification area 22 can be, for example, a solid, regular shaped coating in the form of a rectangle, as shown, which provides a single visible colored line when a fingernail is used to rub or strike a line across the surface of the coating to generate frictional heat in the coating. Alternatively, rectangular verification area 22 may be formed of multiple chromogenic coatings, for example, three rectangular-shaped chromogenic coatings, each rectangular coating providing a different color when frictional heat is applied. Thus, when the fingernail or other stylus is quickly drawn across and in contact with area 22, a line composed of, for example, blue, green and red segments results.

The verification system of the invention provides an effective and simple way of preventing fraudulent passing off of a reproduction of an original document. The chromogenic coating of the present invention is colorless until activated and, thus, it would not be apparent to the would-be forger that the original contains the chromogenic coating forming the verification system. Although advanced copiers are able to make copies which are virtually indistinguishable to the naked eye, the photocopier cannot reproduce the chromogenic coating. Thus, when the lawbreaker presents the photocopied document, authenticity of the document can be quickly verified by application of heat, such as by rubbing a frictional heat generating implement, such as a fingernail or stylus, in the verification area to produce a colored image. In this manner, a document such as a check, money order or prescription, which is suspected of being a fraudulent copy, can be authenticated by a store clerk or bank teller without the need for specialized equipment or training. When a colored image appears in the area, the authenticity of the document is verified. Failure to produce a colored image indicates that the document is a copy and not the original.

The chromogenic coating is colorless as well as being non-pressure sensitive, and non-reactive at room temperature without heat. The chromogenic coating can therefore be located in any position on the document both without being noticeable and without premature activation with normal handling of the document. For example, the chromogenic coating of the present invention can be in an area of the document which is subjected to pressure by writing or endorsement without being conspicuous and without premature activation.

The chromogenic coating in the verification area in preferred embodiments is formed from at least one chromogenic compound and a color developer. The chromogenic compound and the color developer are activated by added heat to interact and react to produce the colored image. In the embodiments of FIGS. 1–3, the chromogenic compound and the color developer are intimately mixed and applied to the information area as a uniform coating. In this manner, frictional heat applied by an object to any portion of the information area will produce a colored image in that portion only.

In the present invention, the chromogenic coating is a self-contained system comprising a solid acidic color developer compound co-reactant and a colorless or substantially colorless solid chromogenic reactant. In preferred embodiments, the color developer has a melting or softening point of about 40° C. to about 200° C., preferably from about 40° C. or 50° C. to about 110° C. or 140° C., especially 50° C. to about 80° C., so as not to react with the chromogenic reactant at room temperature. Application of heat at temperatures in the range of 40° C. to about 200° C. softens or melts the developer rendering it sufficiently mobile to mix and react with the chromogenic compound and produce the distinct visible colored image in situ. Since the reactants are solids at room temperature, no physical separation of the reactants is necessary in the coating. The reactants can be mixed together as a slurry and coated on the document to form an autogenous layer. The chromogenic coating is activated by heat and the coating is non-pressure sensitive.

To have an eye catching result to verify authenticity of the document, for example, it is desirable for the autogenous chromogenic coating to present a striking color contrast to that of the principal image. For example, the dollar amount of a check or the printed information on the check may be in black ink and the color developed by the autogenous coating can be red, violet, orange, green, blue, or yellow to obtain a high degree of contrast. Alternatively, the developed color can be coordinated with the requirements of the financial institution in the case of a check or money order, and may be, for example, the same color as the principal image. Of course, highly contrasting colors can be used, and multiple chromogenic coatings each producing a different colored visible image can be used in the verification area. Thus, for example, a red dot on a black rectangular background could be provided upon activation of the verification area.

Figure 4:
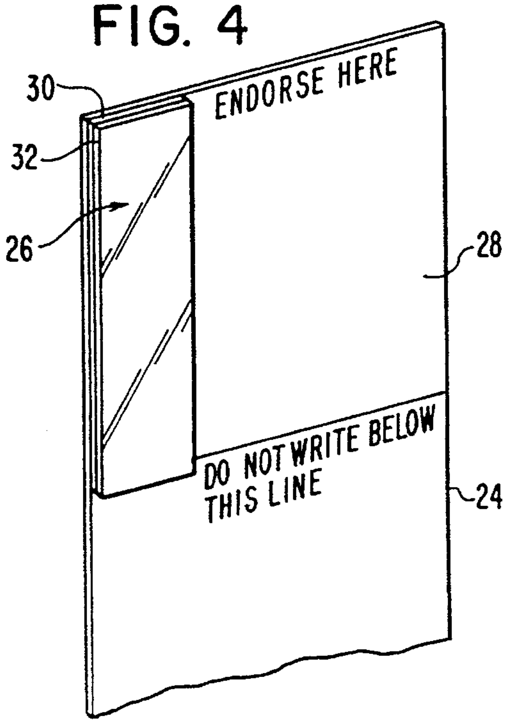
FIG. 4 is a partial, schematic and perspective view of the check of FIG. 2 modified according to one embodiment of the invention.

In a further embodiment illustrated in FIG. 4, the chromogenic composition is coated onto the document 24 within the verification area 26. The verification area 26 is shown adjacent the endorsement area 28 on the rear face of the check in a manner similar to the embodiment of FIG. 2. The endorsement area 28 includes indicia such as instructions to endorse within the endorsement area. In this embodiment, the chromogenic coating composition in the verification area is applied as a multi-layer coating within the localized area. In this embodiment, the chromogenic compound is applied to the substrate of the document as a first layer 30. A second layer 32 comprising the color developer is coated over the first layer to provide the colored image forming coating system.

Verification area 26 may also include pre-printed indicia to provide instructions for use and operation of the verification system. For example, such instructions can read "Scratch here to have color appear—if no color appears, do not accept this document." The chromogenic coating in the verification area can be heat activatable in a manner similar to the embodiment of FIG. 2, for example, by rubbing or striking the coating with a blunt object to provide frictional heat and produce the colored image, thereby verifying the document as an original. Likewise, any source of heat may be used to provide the desired activation temperature resulting in a colored image.

Alternatively, the color developer can be applied first onto the substrate, according to the process described in the above-mentioned U.S. Pat. No. 4,425,386. The chromogenic compound is then coated onto or printed over the first coating. The color reactants may be dissolved or dispersed in a vehicle such as a printing ink base, and the resulting solution printed onto the substrate.

Figure 5:
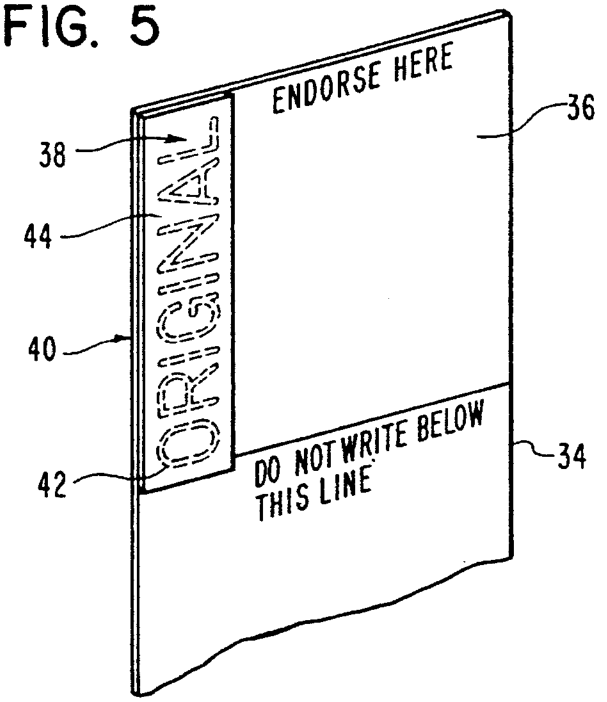
FIG. 5 is a partial, schematic and perspective view of the check of FIG. 2 having a latent image in the verification area.
Figure 6:
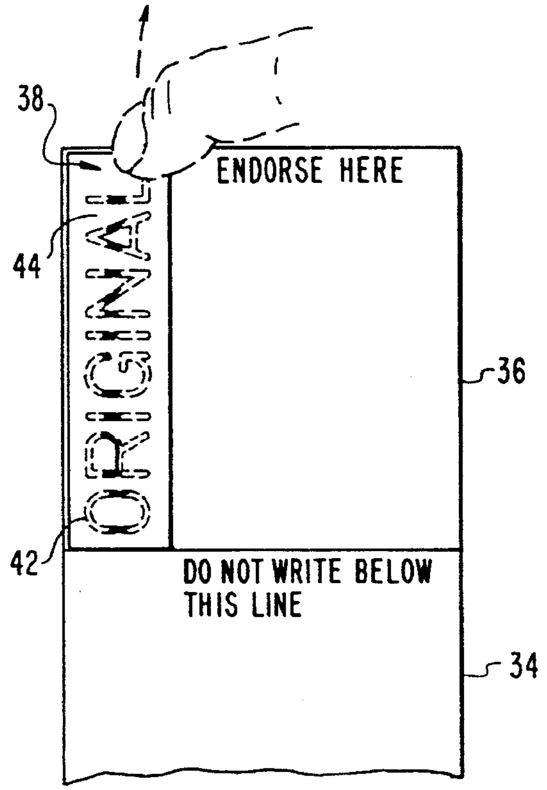
FIG. 6 is a partial, schematic and perspective view of the check of FIG. 5 after applying frictional heat to a portion of the verification area.
Figure 7:
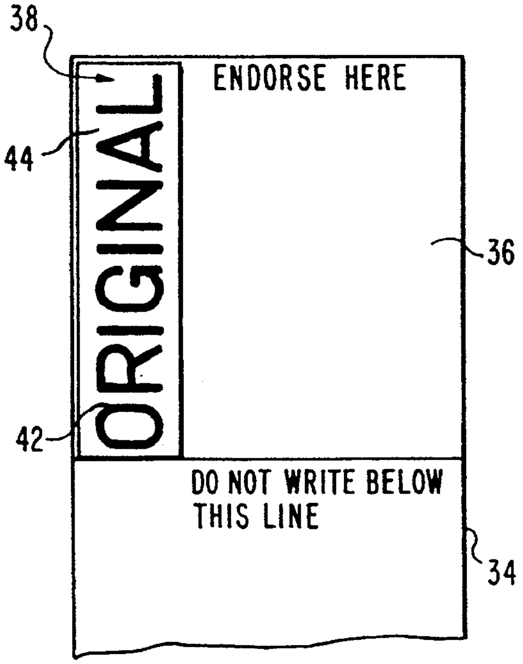
FIG. 7 is a partial, schematic and perspective view of the check of FIG. 5 having the colored image completely displayed to provide verification of the authenticity of the check.

In a further embodiment illustrated in FIGS. 5, 6 and 7, a document 34 is a check including an endorsement area 36 having a verification area 38 comprising chromogenic composition coating 40. The chromogenic compound is formed into a colorless ink and printed to form the word "ORIGINAL" or other alerting message 42 as a latent image on the verification area 38. A layer comprising the color developer 44 is then coated over the chromogenic compound-printed alerting message to form the image-forming chromogenic coating 40. In alternative embodiments, the color developer may be applied as the printed latent image message 42 followed by the chromogenic compound as the coating 44. Although color developer may be spot printed to form the latent image, it is generally preferred to produce the latent image from the chromogenic compound. Alternatively, the latent image may be formed from a mixture of the chromogenic compound and color developer and printed onto the endorsement area 36 to provide the latent image message of FIG. 5 as an autogenous, heat sensitive message.

In use, authenticity of the check can be distinguished from a photocopy or other form of reproduction without the need for specialized equipment. The verification system is activated by applying heat, such as by quickly rubbing the verification area with a fingernail or other blunt object. A single stroke across the verification area 38 to apply sufficient frictional heat will cause the chromogenic compound to react with the color developer and to partially produce the colored image in the form of colored segments as shown in FIG. 6. Applying repetitive strokes across the verification area will cause the entire image 42 to develop as shown in FIG. 7.

In the embodiment of FIGS. 5–7, the latent image 42 is in the form of a word. In alternative embodiments, the latent image can be, for example, a business logo, design, diagram, serial number, combinations of numbers and letters, or other indicia capable of identifying the document.

Likewise, the latent image can be formed of a chromogenic composition which provides a different color from the background on which it is coated when activated. Thus, for example, the latent image word "ORIGINAL" in FIG. 5 could be formed by printing an autogenous chromogenic composition which forms a red visible image onto a background coating of a chromogenic composition which forms a black visible image. Thus, when a fingernail is quickly drawn across the coating in the manner of FIG. 6, the visible portions of the word would appear red, and the visible portions of the background would appear black, yielding a visible line with red and black segments, Also, if desired, the latent image may merely be a circular red image providing background. In other words, any desired configuration may be utilized.

Figure 8:
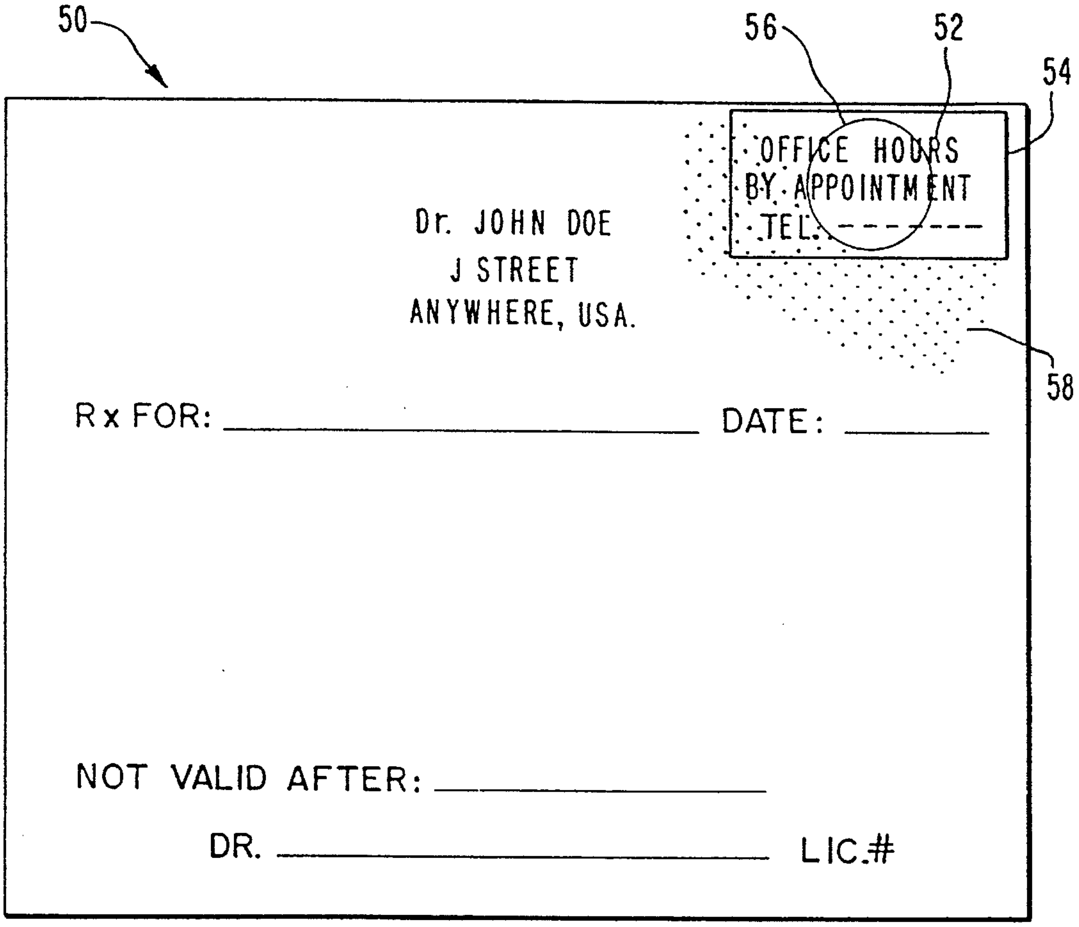
FIG. 8 is a front view of a prescription blank showing the verification area under printed matter in accordance with a preferred embodiment of the invention.

In the embodiment of FIG. 8, prescription form 50 is provided with printed matter 52 including the prescribing doctor's office hours and telephone number in verification area 54 which comprises a black color-producing autogenous chromogenic composition in the form of a solid rectangle. Within the rectangular-shaped coating 54 is a red-color producing autogenous chromogenic composition 56 in the form of a solid circle. Form 50 is coated with dot printing 58 of a printing ink solution which may be a white pigment coating applied to the entire surface of form 50 prior to printing of information, such as 52, to conceal the location of entire verification area 54. After prescription 50 is completed by the physician and presented at the drug store to be filled, the pharmacist or clerk may easily verify that it is an original rather than a reproduction, by applying heat locally to the verification area. Thus, if the clerk rubs or strikes a fingernail quickly across the center of the entire verification area 54, a multi-colored line, which is black, red, black in sequence, will result from the frictional heat, signifying that it is an original.

Alternatively, the clerk or pharmacist may subject verification area 54 to heat generated by an ordinary electric light bulb used for reading, e.g., a 100 watt bulb, or a hand held hair dryer, and the chromogenic compositions in area 54 will reveal a solid red dot or circle in a black rectangle background.

The invention will be further illustrated by the following example. It should be understood that it is not intended to limit the scope of this invention.

EXAMPLE

A chromogenic composition is prepared from a mixture of 25 grams of 7,7'-bis(3-diethylaminofluoran) and 85 grams of calcium carbonate in 275 grams of a 10% aqueous polyvinyl alcohol solution. The mixture is ground in an attritor for one hour to reduce the size of the particles and produce a dispersion.

A color developer is produced by mixing 80 grams of 4-hydroxy-4'-isopropoxyphenylsulfone and 20 grams of dibenzyl oxalate in 250 grams of 10% polyvinyl alcohol aqueous solution. The mixture is ground in an attritor for one hour to reduce the particle size of the components and produce a dispersion.

The chromogenic coating composition is prepared by mixing equal parts by weight of the chromogenic dispersion and the color developer dispersion. A spot is then coated on the back side of a check proximate the endorsement area and allowed to dry. Striking the coating with a fingernail immediately produces a red-colored line.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A method of producing a document having means for authenticating said document, said document comprising a support having a surface bearing an information area and an authentication area, said information area comprising a visible principal image, said method comprising:

applying a localized, substantially colorless, heat activatable chromogenic coating of a heat activatable chromogenic composition to said support to form an authenticating area on said document, said heat activatable chromogenic composition comprising a chromogenic compound and a color developer which are substantially colorless solids in physical contact prior to reaction, but which can chemically react to produce a visible colored image upon application of heat in the range of 40° C. and about 200° C.

2. The method of claim 1, wherein said color developer is a solid having a melting or softening point of about 50° to 80° C.

3. A method of verifying the authenticity of a document, said document comprising a support having a surface bearing an information area and a verification area, said information area having a visible principal image;

said verification area comprising a substantially colorless, localized coating of a heat activatable chromogenic composition comprising a chromogenic compound and a color developer which are substantially colorless solids in physical contact prior to reaction, but which can chemically react to form a visible colored image, said method comprising applying heat to said localized coating of said heat activatable chromogenic composition to form a visible colored image at temperatures above room temperature.

4. The method of claim 3, wherein said visible colored image is formed by applying radiant heat to said localized coating of said heat activatable chromogenic composition.

5. The method of claim 3, wherein said visible colored image is formed by applying heat by convection to said localized coating of said heat activatable chromogenic composition.

6. The method of claim 3, wherein said visible colored image is formed by applying heat by conduction to said localized coating of said heat activatable chromogenic composition.

7. The method of claim 3, wherein said chromogenic coating is heated to a temperature of between about 40° C. and about 200° C. to form a visible colored image.

8. The method of claim 7, wherein said chromogenic coating is heated to a temperature of between about 50° C. and about 80° C. to form a visible colored image.

9. The method of claim 3, wherein said document is a negotiable instrument and said method further comprises the step of presenting said negotiable instrument for payment prior to applying heat to said localized coating.

10. The method of claim 3, wherein said verification area is on the same side of said support as said visible principal image.

11. The method of claim 10, wherein said verification area is coextensive with at least a portion of said principal image.

12. The method of claim 3, wherein said chromogenic coating is on the opposite side of said support from said principal image.

13. The method of claim 3, wherein said support bears multiple localized coatings of said heat activatable chromogenic composition.

14. The method of claim 13, wherein at least two of said localized coatings are on opposite sides of said support from one another.

15. The method of claim 3, wherein said localized coating of a heat activatable chromogenic component is coated to conceal its location.

16. The method of claim 3, wherein the color of said visible colored image developed by reaction between said chromogenic composition and color developer is different from and contrasts with the color of said principal image.

17. The method of claim 3, wherein the color of said visible colored image developed by reaction between said chromogenic composition and color developer is the same as said principal image.

18. The method of claim 3, wherein said chromogenic composition comprises a first coating comprising a chromogenic material and a second coating comprising a color developer, said first and second coatings being superposed on said support.

19. The method of claim 18, said first and second coatings are non-coextensive and the less extensive layer comprises a latent image of an alerting message.

20. The method of claim 19, wherein said localized chromogenic coating is covered with numerous dots printed over said chromogenic coating to conceal said latent image.

21. The method of claim 19, wherein said latent image comprises alphabetic letters, numbers or combinations thereof.

22. The method of claim 19, wherein said latent image comprises the word "ORIGINAL".

23. The method of claim 3, wherein said localized chromogenic coating when developed is a solid, regular geometric visible image.

24. The method of claim 3, where said chromogenic compound is convertible to yellow, red, orange or green.

25. The method of claim 3, wherein said document is a negotiable instrument and said principal image is a monetary amount.

26. The method of claim 3, wherein said chromogenic compound and said color developer are solids, and said chromogenic composition is an intimate mixture thereof to provide an autogenous chromogenic composition.

27. The method of claim 3, wherein said color developer comprises an acidic organic compound.

28. The method of claim 3, wherein said chromogenic composition further comprises an activation temperature suppressant material.

29. The method of claim 28, wherein said activation temperature suppressant material is selected from the group consisting of stearic acid amide, stearic acid methylene bisamide, oleic acid amide, palmitic acid amide, coconut fatty acid amide, dibenzylterephthalate, p-benzyl biphenyl, beta-naphthol benzyl ether, ethylene glycol-m-tolyl ether, di(p-chlorobenzyl)oxalate, and di(p-methylbenzyl)oxalate.

30. The method of claim 3, wherein said document is a pharmaceutical prescription, negotiable instrument or a lottery ticket.

31. The method of claim 30, wherein said document is a pharmaceutical prescription.

32. The method of claim 30, wherein said document is a negotiable instrument.

33. A negotiable instrument comprising a support having a surface bearing an information area including a visible principal image and an authentication area for verifying the authenticity of said document, said authentication area comprising:

a localized, substantially colorless coating of a heat activatable chromogenic composition, said heat activatable chromogenic composition comprising a chromogenic compound and a color developer which are substantially colorless solids in physical contact prior to reaction, but which can chemically react to produce a visible colored image by application of heat at temperatures above room temperature.

* * * * *

UNITED STATES PATENT AND TRADEMARK OFFICE

CERTIFICATE OF CORRECTION

PATENT NO. : 5,536,046

DATED : July 16, 1996

INVENTOR(S) : John C.H. Chang

It is certified that error appears in the above-indentified patent and that said Letters Patent is hereby corrected as shown below:

On the cover page, column 1, after "[*] Notice:", delete "5,536,046", and insert -- 5,401,060 --.

Signed and Sealed this

Eighteenth Day of March, 1997

Attest:

BRUCE LEHMAN

*Attesting Officer*

*Commissioner of Patents and Trademarks*